March 21, 1944.   S. KAHN   2,344,882
GAUGE ADJUSTING MEANS
Filed Sept. 11, 1942
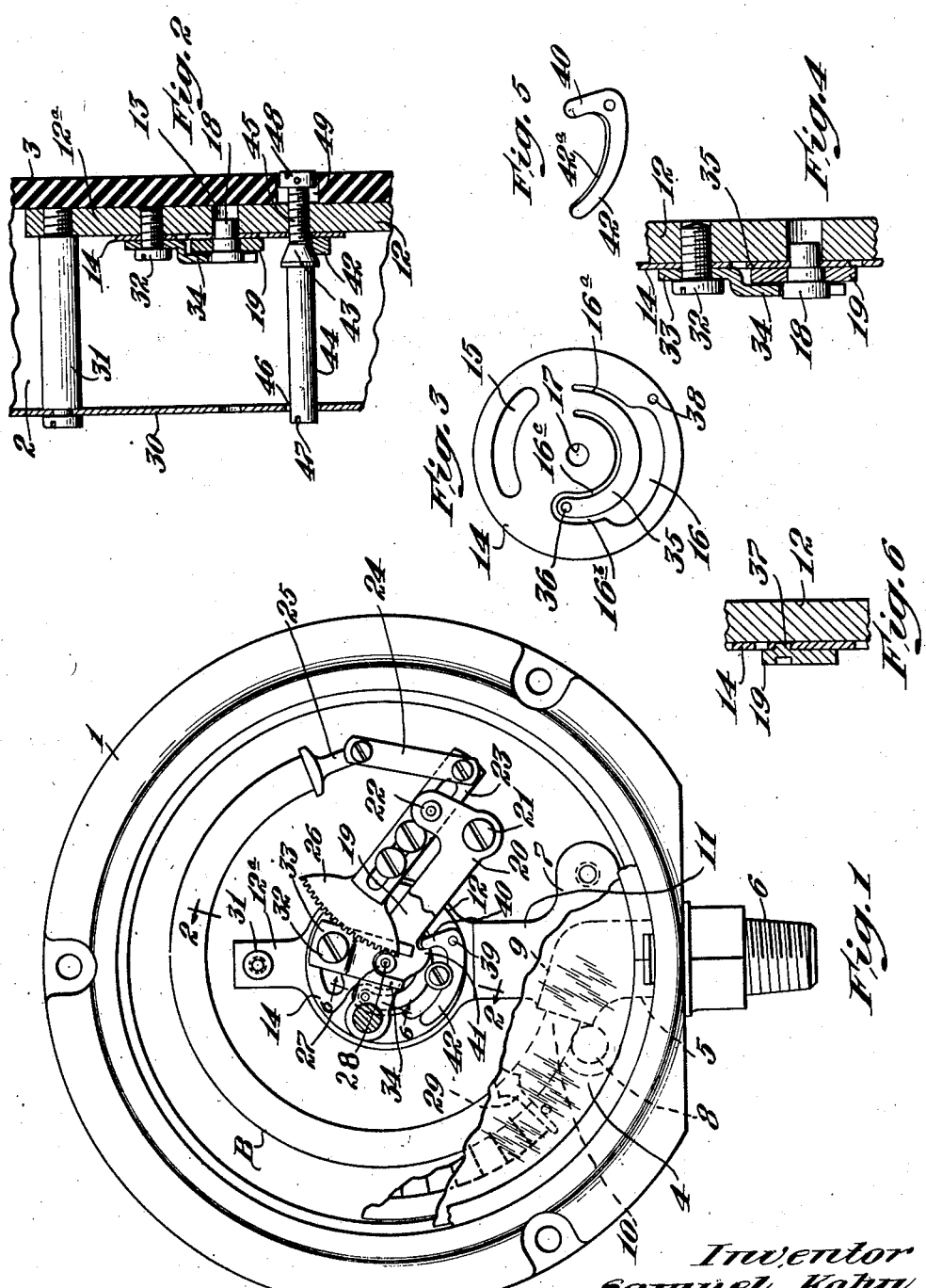
Inventor
Samuel Kahn
by Roberts Cushman & Woodberry
attys.

Patented Mar. 21, 1944

2,344,882

UNITED STATES PATENT OFFICE 2,344,882

GAUGE ADJUSTING MEANS

Samuel Kahn, Bridgeport, Conn., assignor to Manning, Maxwell & Moore, Incorporated, New York, N. Y., a corporation of New Jersey Application September 11, 1942, Serial No. 457,922

15 Claims. (Cl. 73—109)

This invention pertains to dial instruments, for example pressure gauges, dial thermometers or the like and relates more particularly to means for calibrating and adjusting such instruments. Usually such instruments employ a Bourdon tube or the like as the motor means—the motion of the free end of the tube being multiplied for transmission to the index or pointer. Owing to the intrinsic variations in the specific properties of the materials used it is necessary, both during manufacture and in the course of ordinary conditions of use, to adjust the relationship between the Bourdon tube and the index so that the motion of the tube tip will be transmitted in proper ratio to the index and so that the desired range of values to be indicated will correspond to those designated by the index relatively to its cooperating graduated dial.

In the more usual instruments of this type, such adjustments can only be made after removal of the index or pointer and the dial. Consequently, in such prior types of instrument it has been necessary to make adjustments (bending parts, exchanging parts for others of different dimensions, or releasing and relatively moving parts which are normally clamped together) with the indicator and dial removed; then to replace the dial and pointer and observe the relation of the pointer relatively to the dial; and if necessary repeat these operations until by such trial and error a sufficiently correct approximation has been arrived at. Since a pressure gauge is a delicate piece of mechanism, attempts by unskilled persons to make such adjustments often result in serious injury to the mechanism.

I am aware of the patent to Hopkins, No. 1,484,068, February 19, 1924, which describes how the entire gauge movement mechanism may be mounted to swing about the axis of the pointer so that by first removing the dial and index and then loosening retaining screws the gauge movement as a whole may be swung about the index staff thereby to calibrate the gauge, thus assuring proper initial position of the sector relatively to the pinion with which it meshes without necessitating more difficult operations. This arrangement thus provides improved and accurate means for making an initial calibration or the relatively infrequent recalibrations of the gauge necessitated by slow and permanent changes in the characteristics of the Bourdon tube, but does not avoid the necessity for removal of the dial and index prior to calibration.

Since gauges which are in constant use, particularly if exposed to vibration, as when used on a locomotive, tend to get out of adjustment very quickly by reason of wear or gradual shifting of relatively adjustable parts, it is necessary quite frequently to adjust the pointer relatively to the zero point of the dial or other fixed graduation in order to assure that the instrument will indicate the true pressure. Thus it is required by law that the gauges of locomotives be so adjusted at least once in three months.

The present invention has for its principal object the provision of means making possible a very accurate and fine adjustment of the pointer or index without requiring removal of the index or dial or even of the transparent front panel and by the movement of a single readily accessible part. Since this adjustment may be made without removing the pointer from its staff or removing the dial, the results of the adjustment may be observed at once and accurate adjustment attained at the first attempt.

As such a fine adjustment of the pointer requires but slight relative movements of the gauge parts, while on the other hand initial calibration or recalibration may require relatively large movements of the parts, it is, as a practical matter, undesirable to combine the two adjustments in a single element since a single adjustment means, designed to provide for fine adjustment, would be too slow in its action for accomplishing the coarser adjustment of initial calibration. Accordingly, a further object of the invention is to provide an instrument of this type wherein provision is made for coarse adjustment for calibration, and further and additional means is provided for obtaining the desired final and fine or micrometer adjustment, the two adjusting means being combined in a single, simple, inexpensive, durable and reliable construction.

Other and further objects and advantages of the invention will be pointed out in the following more detailed description and by reference to the accompanying drawing wherein Fig. 1 is a fragmentary front elevation of a dial instrument, for example a pressure gauge, embodying the present invention;

Fig. 2 is a fragmentary section substantially on the line 2—2 of Fig. 1, with certain parts omitted;

Fig. 3 is a front elevation of a supporting element for the movement mechanism of the instrument;

Fig. 4 is a fragmentary section on the same plane as Fig. 2 but to larger scale showing details of construction;

Fig. 5 is a perspective view of an adjusting lever constituting an element of the novel mechanism; and Fig. 6 is a section on line 6—6 of Fig. 1.

Referring to the drawing, the numeral 1 designates an instrument of the class described, for instance a dial thermometer or pressure gauge, having a casing which may be of any conventional type but which is preferably of the kind disclosed in the patent to Graesser et al., No. 2,271,423, dated January 27, 1942. This casing comprises the side wall 2, the rear wall 3 and the front panel 4, the latter being of transparent material, for instance glass or a synthetic resin. This case is preferably substantially air-tight to form a suitable enclosure for the operative parts of the instrument. At a suitable point the case is provided, either in the rear wall 3 or the side wall 2 (as here shown at the lower part of the side wall) with an opening for the reception of the support 5 having the screw-threaded nipple portion 6 for attachment to a conductor for pressure fluid. This support 5 is furnished with a bracket portion 7 disposed within the casing, usually against the inner surface of the rear wall 3, and having openings for the reception of attaching screws or bolts 8 by means of which the casing is rigidly secured to the support. The support is also provided with a socket portion 9 in which is rigidly secured in a leak-tight manner the fixed end 10 of the Bourdon tube B it being understood that this Bourdon tube is here shown merely by way of example of a pressure fluid motor of a conventional type.

The support 5 also comprises an upwardly directed post 11 whose upper end is preferably more or less disk-like to form the pad 12 to which the movement mechanism is secured. As here illustrated (Fig. 2) this pad 12 is provided at its center with an aperture 13. Coaxial with the pad and with the opening 13 is a supporting plate 14 preferably made of thin spring metal, for example steel, and which is provided with a pair of arcuate slots 15 and 16 concentric with an opening 17 at the center of the plate. This opening 17 receives the inner or rear end portion of a bushing 18 which projects into the aperture and which forms the rear bearing for the index staff, hereinafter referred to.

The movement mechanism is carried by a frame comprising the rigid rear plate 19 and the rigid front plate 20 (Fig. 1), said plates, if desired, being of the same configuration and being held in rigidly spaced relation by means of shouldered posts, one of which is indicated at 21. These plates 19 and 20 are furnished with aligned bearings for the opposite ends of a staff 22 to which is secured the sector lever arm 23, said arm being connected by means of the link 24 to the tip bracket 25 attached to the free end of the Bourdon tube B. The opposite end of the lever arm 23 carries the sector gear 26 (the arm 23 being adjustable in length, if desired, in accordance with the usual practice), said sector gear 26 meshing with a pinion 27 fixed to the index staff, the rear end of which finds a bearing in the bushing 18 above referred to, its forward portion turning in a bearing in the front plate 20 of the movement frame. The pointer or index 29 is secured to the forward end of the index staff 28 which projects forwardly through an opening in the graduated dial 30 which, as here shown, is supported by one or more rigid posts 31 secured to an extension or extensions 12ª (Fig. 2) of the pad 12.

A screw 32, having a large flat head, passes through an opening in a bracket member 33, through the arcuate slot 15 of the supporting plate 14, and into a threaded opening in the pad 12. The bracket 33 has a forwardly disposed bifurcated portion 34 which straddles the forward part of the bushing 18 and which overlies the front surface of the rear plate 19 of the movement frame. While the bifurcated end portion of this bracket overlies the rear plate of the movement frame and thus prevents forward movement of the frame, it does not engage said plate, there being a slight clearance between it and the front surface of the plate 19, thus permitting the frame to turn freely about the axis of the bushing 18.

The slot 16 in the supporting disk or plate 14 is extended as indicated at 16ª, 16ᵇ and 16ᶜ, so as to define an arcuate, resilient tongue 35 integral at one end with the body of the plate and having its other end free to be flexed to a greater or lesser radius of curvature. The free end of this spring tongue is provided with an aperture 36 which receives a pintle 37 (Fig. 6) preferably formed by striking rearwardly the metal of the rear plate 19 of the movement frame, such pintle thus constituting a pivotal connection between the frame and the tongue 35.

The supporting plate or disk 14 is also provided with an opening 38 which receives a pivot pin 39 (Fig. 1) forming the fulcrum for a bell crank lever (Fig. 5) comprising a short arm 40 whose free end engages an abutment shoulder 41 (Fig. 1) integral with the rear plate 19 of the movement frame. This bell crank lever also has an elongate arm 42 whose inner edge 42ª is arcuate and which normally registers more or less closely with the outer edge of the slot 16.

A cam or wedge element 43, here shown as a conical head carried by a screw 44, engages the inner edge 42ª of the bell crank lever. If desired the forward corner of the lever may be beveled off along this edge so as to provide a more extended surface for contact with the conical surface 43. The screw 44 projects at its forward end through an opening 46 in the dial and is provided at its forward end with convenient means whereby it may be turned, for instance, a screw driver slot 47. Since this slot is forward of the dial it is possible to turn the screw without removing the dial. The rear portion of this screw (rearwardly of the conical head 43) passes freely through the arcuate slot 16 in the plate 14 and is threaded at 45 (preferably with a fine or low pitch thread). The threaded portion of the screw engages a threaded bore in the pad 12. Preferably the screw projects beyond the pad and into an opening 49 in the rear wall of the casing, said opening 49 being of larger diameter than the screw. The screw is furnished with a fixed collar or abutment 48 at its rear end thereby to limit the forward movement of the screw. This abutment 48 is pinned or otherwise fixed to the rear end of the screw and is provided with a screw driver slot or other means for turning it, thereby making it possible to calibrate or readjust the pointer from the outside rear of the case when the latter is accessible.

The initial calibration of the instrument for obtaining the proper angular relation of the link 24 and lever 23 is made before the dial is put in position. To calibrate the device, the screw 32 is first loosened, thus permitting the supporting disk 14, together with all of the parts carried thereby, to be swung about the axis of the index staff. Such movement of the frame, as described in the above patent to Hopkins, provides convenient means for calibrating the instrument without necessitating the bending of parts or the substitution of parts of different sizes. After the instrument has thus been properly calibrated, the screw 32 is tightened, thus holding the supporting plate 14 in proper position where it may remain during the entire life of the instrument.

After such relatively coarse calibration, the dial is put in place and the pointer or index is mounted on the front of the index staff. Then by turning the screw 44, the conical head 43 is caused to advance or retreat from the arm 42 of the bell crank lever, thus rocking the lever and by minute and substantially micrometric motion swinging the movement frame relatively to the plate 14 about the axis of the index staff. Since such movement is resiliently opposed by the spring tongue 35, proper contact of the conical surface 43 with the lever arm 42 is assured regardless of the direction of rotation of the screw. By the employment of screw threads 45 of low pitch, it is possible to retain the adjustment thus made for substantially any period of time regardless of the conditions of use of the instrument or the amount of vibration to which it may be subjected. With this construction it is thus possible to adjust the pointer with the greatest accuracy and by the mere turning of the screw 44 and without necessitating the loosening of any parts prior to such adjustment or the tightening or clamping of parts after adjustment.

While one desirable embodiment of the invention has been herein disclosed by illustration and description, it is to be understood that the invention is not necessarily limited to this precise embodiment but is to be regarded as broadly inclusive of any and all equivalents falling within the terms of the appended claims.

I claim:

1. In combination in a dial instrument having an outer casing provided with a transparent panel and which houses a graduated dial, a motor device, a movement mechanism comprising an index staff and connections for transmitting motion from the motor device to said staff and a pointer mounted on the staff for cooperation with the dial, a support for the movement mechanism, said support being mounted to turn about the axis of the index staff, thereby to permit calibration of the instrument, means for retaining the support in adjusted position, the movement mechanism being mounted on said support to turn about the axis of the index staff relatively to the support, and means for turning the movement mechanism relatively to the support and for retaining it in adjusted position thereby accurately to adjust the position of the pointer relatively to the dial.

2. In combination in a dial instrument having an outer casing provided with a transparent panel and which houses a graduated dial, a motor device, a movement mechanism comprising an index staff and connections for transmitting motion from the motor device to said staff and a pointer mounted on the staff for cooperation with the dial, a support for the movement mechanism, said support being mounted to turn about the axis of the index staff thereby to permit calibration of the instrument, means for retaining the support in adjusted position, the movement mechanism being mounted on the support to turn relatively to the latter about the axis of the index staff, and micrometer means for turning the movement mechanism relatively to the support thereby to adjust the pointer relatively to the dial graduations.

3. In combination in a dial instrument having an outer casing provided with a transparent panel and which houses a graduated dial, a motor device, a movement mechanism comprising an index staff, a frame carrying bearings for said staff and connections for transmitting motion from the motor device to said staff and a pointer mounted on the staff for cooperation with the dial, a support for the movement mechanism arranged to turn about the axis of the index staff, means for retaining the support in adjusted position, the frame of the movement mechanism being mounted on the support to turn relatively to the latter about the axis of the index staff, micrometric means operative positively to turn the movement mechanism frame in one direction relatively to the staff for adjusting the pointer relatively to the dial, and resilient means connecting the movement frame to the support, said resilient means constantly tending to turn the movement frame in the opposite direction, the adjusting means comprising an actuating element accessible at the front of the dial.

4. In combination in a dial instrument of the kind wherein an outer casing provided with a transparent panel houses a graduated dial, a motor device, a movement mechanism comprising an index staff and connections for transmitting motion from the motor device to said staff, an index on the staff cooperable with the dial, and a frame supporting the movement mechanism, means supporting the movement frame to turn about the axis of the index staff, and means for turning the movement frame, said latter means comprising a lever arranged to swing about a normally fixed axis, said lever having an arm which engages a part of the movement frame at a point eccentric to the index staff, and an actuating element engaging the other arm of said lever and operative to swing the latter.

5. In combination in a dial instrument of the kind wherein an outer casing provided with a transparent panel houses a graduated dial, a motor device, a movement mechanism comprising an index staff and connections for transmitting motion from the motor device to said staff, an index on the staff cooperable with the dial, and a frame supporting the movement mechanism, the movement frame being mounted to swing about the axis of the index staff, and means for swinging said frame comprising a lever turning about a normally fixed axis eccentric to the index staff, said lever having one arm which engages a portion of the movement frame, and wedge means engaging the other arm of the lever and operative to swing the latter.

6. In combination in a dial instrument of the kind wherein an outer casing provided with a transparent panel houses a graduated dial, a motor device, a movement mechanism comprising an index staff and connections for transmitting motion from the motor device to said staff, an index on the staff cooperable with the dial, and a frame supporting the movement mechanism, the movement frame being mounted to swing about the index staff, and means for swinging the frame comprising a lever turning about a normally fixed axis, said lever having two arms one of which engages the movement frame, and a cam surface engaging the other arm of the lever, and means whereby said cam surface may be advanced or retracted thereby to swing the lever.

7. In combination in a dial instrument of the kind wherein an outer casing provided with a transparent panel houses a graduated dial, a motor device, a movement mechanism comprising an index staff and connections for transmitting motion from the motor device to said staff, an index on the staff cooperable with the dial, and a frame supporting the movement mechanism, the movement frame being arranged to swing about the axis of the index staff, yieldable means tending to swing it in one direction, and means operative to turn it in the other direction comprising a lever arranged to turn about a fixed axis, said lever comprising two arms, one of which engages the movement frame, and a screw whose axis is substantially parallel to that of the index staff, said screw having a conical portion engaging the other arm of the lever whereby axial advance or retraction of the screw swings the lever in one direction or the other.

8. In combination in a dial instrument of the kind wherein an outer casing provided with a transparent panel houses a graduated dial, a motor device, a movement mechanism comprising an index staff and connections for transmitting motion from the motor device to said staff, an index on the staff cooperable with the dial, and a frame supporting the movement mechanism, the movement frame being arranged to turn about the axis of the index staff, spring means tending to swing the frame in one direction, and a lever for swinging the frame in the opposite direction, said lever being pivoted to turn about a normally fixed axis and comprising an arm which engages the movement frame, and wedge means engaging the lever operative to swing the lever, thereby to turn the frame in opposition to the spring.

9. In combination in a dial instrument of the kind wherein an outer casing provided with a transparent panel houses a graduated dial, a motor device, a movement mechanism comprising an index staff and connections for transmitting motion from the motor device to said staff, an index on the staff cooperable with the dial, and a frame supporting the movement mechanism, the movement frame being arranged to swing about the axis of the index staff, spring means tending to swing the frame in one direction, a lever for swinging it in the opposite direction, said lever comprising an arm which engages the frame, and a screw having threaded engagement with a fixed part of the instrument and provided with a conical portion which constantly engages the lever.

10. In combination in a dial instrument of the kind wherein an outer casing provided with a transparent panel houses a graduated dial, a motor device, a movement mechanism comprising an index staff and connections for transmitting motion from the motor device to said staff, an index on the staff cooperable with the dial, and a frame supporting the movement mechanism, the movement frame being arranged to turn about the axis of the index staff, spring means tending to turn the frame in one direction, a lever for turning it in the opposite direction, said lever comprising two arms one of which engages a part of the frame, a screw whose axis is substantially parallel to that of the index staff, said screw having threaded engagement with a fixed part of the instrument and having its forward end exposed in front of the dial, the screw being provided with a conical portion which engages the other arm of the lever.

11. In combination in a dial instrument of the kind wherein an outer casing, provided with a transparent panel, houses a graduated dial, a motor device, a movement mechanism comprising an index staff and connections for transmitting motion from the motor device to said staff, an index on the staff cooperable with the dial, and a frame supporting the movement mechanism, the movement frame being mounted to turn about the axis of the index staff, a spring tending to move the movement frame in one direction, a lever for turning the frame in the opposite direction, said lever comprising two arms one of which bears against the movement frame, and a screw whose axis is substantially parallel to that of the index staff, said screw having threaded engagement with a fixed portion of the instrument, means limiting forward movement of the screw, the forward portion of the screw passing through an aperture in the dial and being provided at its forward end with means for turning it, and a conical part fixed to the screw and constantly engaging the other arm of the lever.

12. In combination in a dial instrument of the kind wherein an outer casing, provided with a transparent front panel, houses a graduated dial, a motor device, a movement mechanism comprising an index staff and connections for transmitting motion from the motor device to said staff, an index on the staff cooperable with the dial, and a frame supporting the movement mechanism, a support for the movement frame having arcuate slots for the reception of retaining screws, said support comprising an integral spring tongue, the movement frame being arranged to swing about the axis of the index staff, pivot means uniting the movement frame to the free end of said spring tongue, a bell crank lever pivotally mounted on the support, one arm of the lever engaging a surface of the movement frame, and a screw having its axis substantially parallel to the axis of the index staff, said screw passing freely through one of said arcuate slots and having threaded engagement with a fixed part of the instrument, said screw having a conical portion which engages the other arm of the lever, and means whereby said screw may be turned.

13. A dial instrument of the kind wherein an outer casing, provided with a transparent front panel, houses a graduated dial, a motor device, a movement mechanism comprising an index staff and connections for transmitting motion from the motor device to said staff and a pointer on the index staff for cooperation with the dial, and wherein the entire movement mechanism is mounted for rotary movement about the axis of the index staff thereby to permit calibration of the instrument, characterized in having means for accurately adjusting the pointer relatively to the dial graduations, said pointer adjusting means comprising a lever having an actuating arm arranged to engage the movement mechanism, the lever being mounted to turn about an axis parallel to the axis of the index staff, means tending to keep the actuating arm of the lever in contact with the movement frame, a rotary conical wedge which constantly engages the other arm of the lever, and an actuating element for turning the wedge, said actuating element being normally accessible from the exterior of the instrument casing.

14. In combination in a dial instrument of the kind wherein an outer casing provided with a transparent panel houses a graduated dial, a motor device, a movement mechanism comprising an index staff and connections for transmitting motion from the motor device to said staff, an index on the staff cooperable with the dial, and a frame supporting the movement mechanism, the movement frame being arranged to swing about the axis of the index staff, spring means tending to swing the frame in one direction, a lever for swinging it in the opposite direction, said lever comprising an arm which engages the frame, and a screw having threaded engagement with a fixed part of the instrument and provided with a conical portion which constantly engages the lever, one end of said screw being disposed at the rear of and outside the instrument casing and having means at its rear end whereby it may be turned.

15. A dial instrument of the kind wherein an outer casing, provided with a transparent front panel, houses a graduated dial and a motor device, a support on which the casing and motor device are fixedly mounted, the casing also housing a movement mechanism comprising an index staff and connections for transmitting motion from the motor device to said staff, and a pointer on the index staff for cooperation with the dial, a pad fixed within the casing, a forwardly projecting bushing supported by the pad, the forward end of the bushing constituting a rear bearing for the index staff, a support mounted for rotation upon the bushing, means normally holding the support stationary in adjusted position, a frame for the movement mechanism mounted on the bushing, the frame being rotatable relatively to the support, resilient means opposing rotation of the frame relatively to the support whereby rotation of the support relatively to the pad effects a relatively coarse calibration of the instrument while the rotation of the frame relatively to the support effects a relatively fine adjustment of the pointer with reference to the dial graduations, and manually actuable adjusting means operative to turn the frame relatively to the support and to retain it in adjusted position, said manually actuable adjusting means comprising an element which is normally behind the transparent panel but which is accessible at the front of the dial.

SAMUEL KAHN.